June 26, 1928.  R. S. OLSON  1,674,698

VARIABLE SPEED TRANSMISSION

Filed March 21, 1925  2 Sheets-Sheet 1

INVENTOR.
R. S. Olson
BY
ATTORNEY.

June 26, 1928.
R. S. OLSON
1,674,698
VARIABLE SPEED TRANSMISSION
Filed March 21, 1925
2 Sheets-Sheet 2
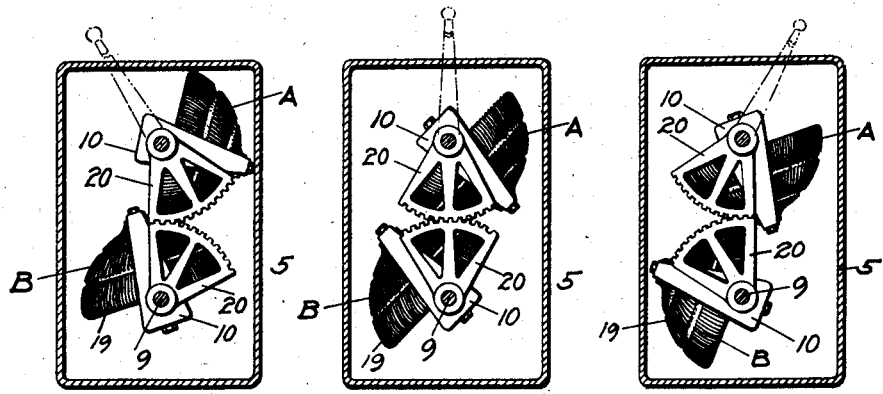
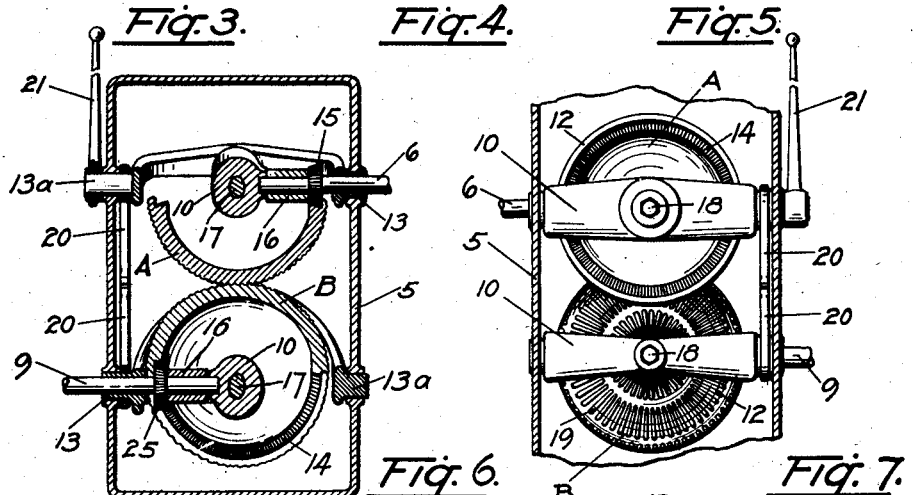
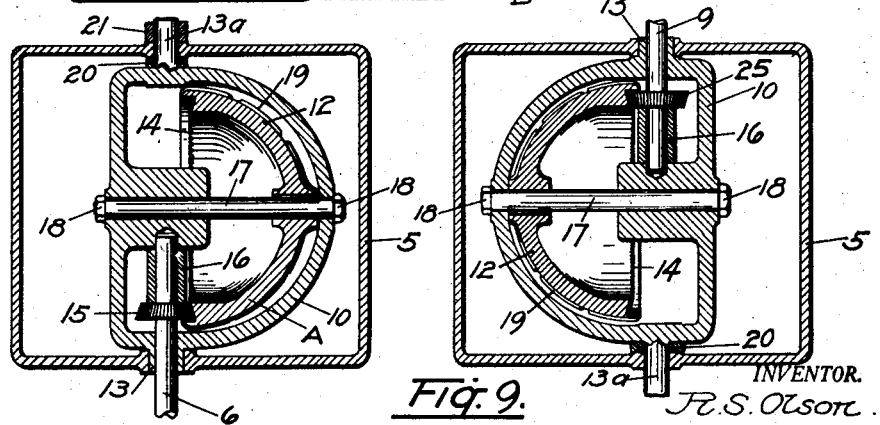
INVENTOR.
R. S. Olson.
BY
ATTORNEY.

Patented June 26, 1928.

1,674,698

UNITED STATES PATENT OFFICE.

REUBEN S. OLSON, OF GREYBULL, WYOMING.

VARIABLE-SPEED TRANSMISSION.

Application filed March 21, 1925. Serial No. 17,403.

This invention relates to gear-mechanism for varying the speed of motor vehicles and other machines, generally known as change-speed transmissions, and it is an object of the invention to provide through the intermediary of a plurality of circumferential gears of varying diameters upon spheroidal surfaces of rotary bodies mounted for angular adjustment, a simple and efficient mechanism to smoothly vary the speed ratio between a driving shaft and a driven shaft without strain or grind and with a smaller and more compactly arranged number of parts than is usually employed in movements of the same type.

With this and other objects in view, my invention consists in the construction, arrangement and combinations of parts illustrated in the accompanying drawings in the several views of which like parts are similarly designated and in which:

Figures 3, 4 and 5 are elevations of the mechanism drawn to a reduced scale, showing the elements thereof in the three positions to which they are adjusted for the transmission of motion from the one to the other at different speeds;

Figure 6 is a reduced section on the line 6—6, Figure 2;

Figure 7 is a similarly reduced elevation of the two transmission elements comprised in the mechanism, taken at right angles to the line 7—7, Figure 2;

Figure 8, represents a reduced section taken along the line 8—8 in Figure 2; and Figure 9 is a similarly reduced, fragmentary section in the plane indicated by the line 9—9, Figure 2.

Figure 1:
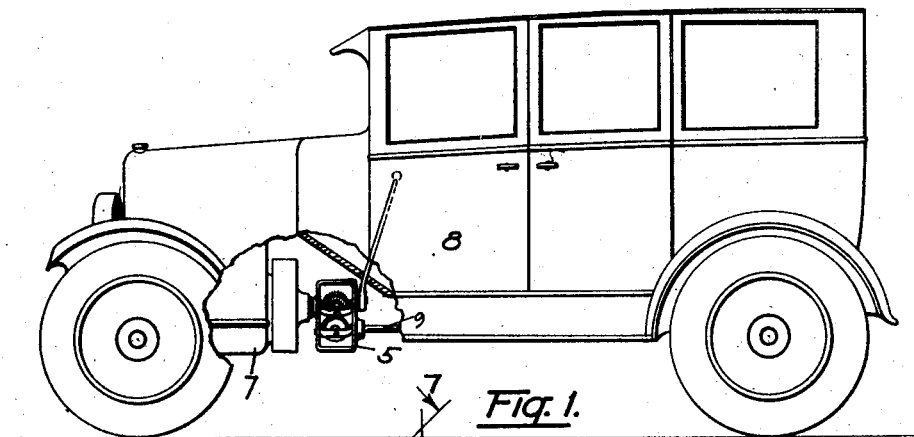
Figure 1 represents a side elevation of a motor vehicle showing a method of applying the invention for the transmission of motion from an engine shaft at the front end of the vehicle to a shaft which has a driving connection with the live axle of the same.

Referring further to the drawings, the numeral 5 designates a casing in which the transmission mechanism is enclosed, 6 the driving shaft which in the illustrative application of the invention shown in Figure 1, is a part of the engine 7 of the motor vehicle 8, and 9 the driven shaft by means of which the mechanical power produced by the engine is transmitted to the traction wheels of the vehicle.

The mechanism for transmitting the movement of the driving shaft to the driven shaft in accordance with my invention comprises two units A and B each including a supporting member 10 mounted for rotary adjustment in bearings on the casing, and a hollow hemispherical gear member 12 mounted on the supporting member to rotate about an axis at right angles to the rotary axis of the same.

Figure 2:
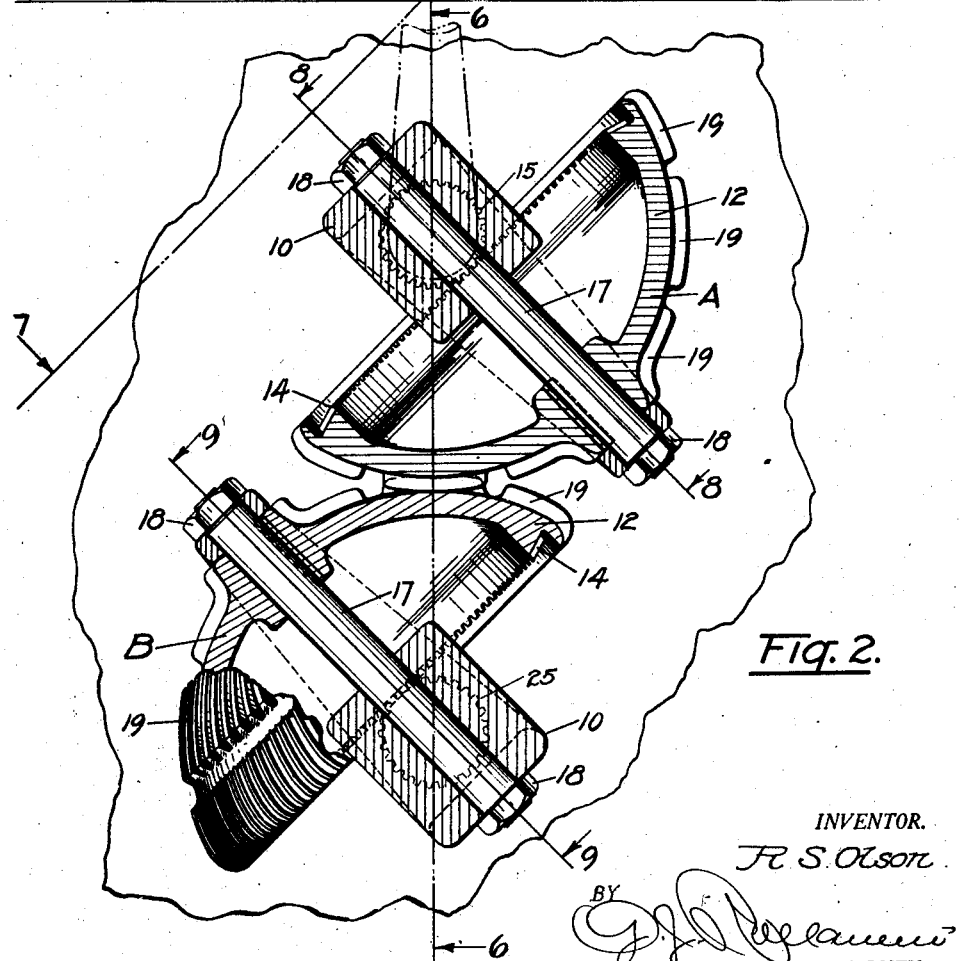
Figure 2, is a sectional elevation of the two transmission elements comprised in the invention in their co-operative relation.

The two units are identical in form and construction but reversely disposed with relation to each other for the co-operative engagement of their hemispherical members, as best shown in Figure 2 of the drawings.

The supporting member 10 of each unit consists of a yoke provided with axially alined trunnions 13 and 13ª for its support in the bearings of the casing, one of the trunnions (13) being bored to admit the driving or driven shaft for operative connection with the respective gear member 12.

The member 12 of each unit has for this purpose an internal crown gear 14 and the shafts 6 and 9 and are provided near their extremities with beveled pinions 15 and 25 which mesh with the crown gears of the respective units, the ends of the shafts are supported on bearings of the supporting members, and bushings 16 are provided to increase the rigidity of the shafts and to resist axial motion.

The unit A thus associated with the driving shaft 6, will hereinafter be referred to as the driving unit and the unit which is in driving connection with the driven shaft 9, as the driven unit of the transmission.

The spheroidal gear-members are keyed on shafts 17 by which they are mounted for rotation in axially alined bearings of the respective supporting yokes 10. The shafts thus disposed are axially at right angles to the alined trunnions of the supporting members and they are secured against longitudinal displacement by nuts 18.

Upon the hemispherical surfaces of the members 12 of the transmission units are formed a plurality of circular series of teeth 19 in planes at right angles to the axes of rotation of the members.

In the construction illustrated in the drawings, each transmission member has three series of gear teeth enabling the operator of the vehicle or machine to which the transmission is applied to vary the gear ratio between the driving unit and the driven unit to what is commonly known as high, intermediate and low speeds.

It is to be understood however, that the number of gears on the transmission members may be varied in order to increase or decrease the gear ratios obtainable by adjustment of the units of which the members are a part as will hereinafter be described.

The teeth of the series of largest diameter adjacent the outer edge of each gear member are rounded at their ends and those of the series of smallest diameter nearest the apex of the member are correspondingly concaved so that the interlocking engagement of these gears will be maintained under all conditions and the ratio between the same can be increased to the maximum within the limits of the hemispherical surfaces of the members.

With the transmission units reversely positioned with relation to each other as shown in the drawings, the axes of rotation of their supports are parallel and the point of contact of the constantly engaging gear members can be changed from one pair of gears to another by rotary adjustment of the units about the axes of the supports.

Thus when the axes of rotation of the two members are parallel as in the position illustrated in Figure 4, the middle gears which are of equal diameters, are in mesh and the two members will thus rotate at equal velocities in what is commonly known as the intermediate position of the mechanism.

In order to increase the rotative speed of the driven shaft relative to that of the driving shaft, the transmission members are adjusted to the high speed position illustrated in Figure 3 by changing the point of contact to the largest gear of the member 12 of the driving unit and the smallest gear of the corresponding member of the driven unit and when it is desired to decrease the angular velocity of the driven shaft with relation to that of the driving shaft in what is known as the low speed position, the gear members are adjusted in the opposite direction to bring the gear of smallest diameter on the member 12 of the driving unit in contact with the gear of largest diameter on the same member of the driven unit as shown in Figure 5.

The adjustment of the members is effected by the simultaneous rotation of the two transmission units about the parallel axes of their supports and the mechanism provided to produce this movement consists of two segmental gears 20 mounted on corresponding trunnions of the supporting members of the two units within their casings and a lever 21 on the trunnion of the driving unit which when the transmission is applied to a motor vehicle, extends within easy reach of the driver as shown in Figure 1.

From the foregoing description, it will be evident that the transmission is readily changed from one gear ratio to another in either direction by varying the tangential point of contact of the hemispherical gear members through simultaneous rotation of the two units about their parallel axis.

Inasmuch as the gears are constantly in mesh and their point of contact is changed gradually by the above described adjustment of the hemispherical gear-bodies, grinding and stripping of the gears which often occurs in other selective transmissions, is avoided, and the speed ratios between the driving shaft and the driven shaft are smoothly changed by the simple expedient of moving the controlling lever in the required direction.

Having thus described the variable speed transmission in the best form at present known to me, I desire it understood that changes in the construction and relative arrangement of the parts thereof, may be resorted to without departing from the scope of the invention as defined in the hereunto appended claims.

The adjusting mechanism may for example, be varied in accordance with the position of the transmission on the vehicle or other machine to which it is applied and while I have shown and described the transmission members as being of hemispherical form, it is to be understood that my invention includes the use of any spheroidal form whose plane sections transverse to its axis are circular and whose generatrices are curved in the arc of a circle.

By increasing the diameter of the gear members, a larger number of gears of standard size and depth can be formed at the peripheral surface thereof to attain a correspondingly increased variance of speeds and by a modified construction and arrangement of the supporting members of the units, gears similarly constructed and relatively positioned may be employed in a differential or other transmission mechanism of similar character.

Having thus described my invention, what I claim and desire to secure by Letters Patent is:

1. In variable speed transmission, two units each including a rotary support, an axle carried at its ends on the support at right angles to the axis of rotation thereof, and a rotary spheroidal transmission member on said axle, the members of the two units being reversely disposed peripherally in contact with each other, means for varying the point of contact of the members by rotary adjustment of the supports, and a driving element and a driven element in movement transmitting connection with the members.

2. In variable speed transmission, a stationary casing having pairs of opposed openings, supports having trunnions in said openings, rotary members on the supports in contact with each other and axles in movement transmitting connection with the members, each axle being journaled in one of the supports and extending through a trunnion, the respective trunnions for the two axles being on opposite sides of the casing.

In testimony whereof I have affixed my signature.

REUBEN S. OLSON.